Patented Mar. 26, 1940

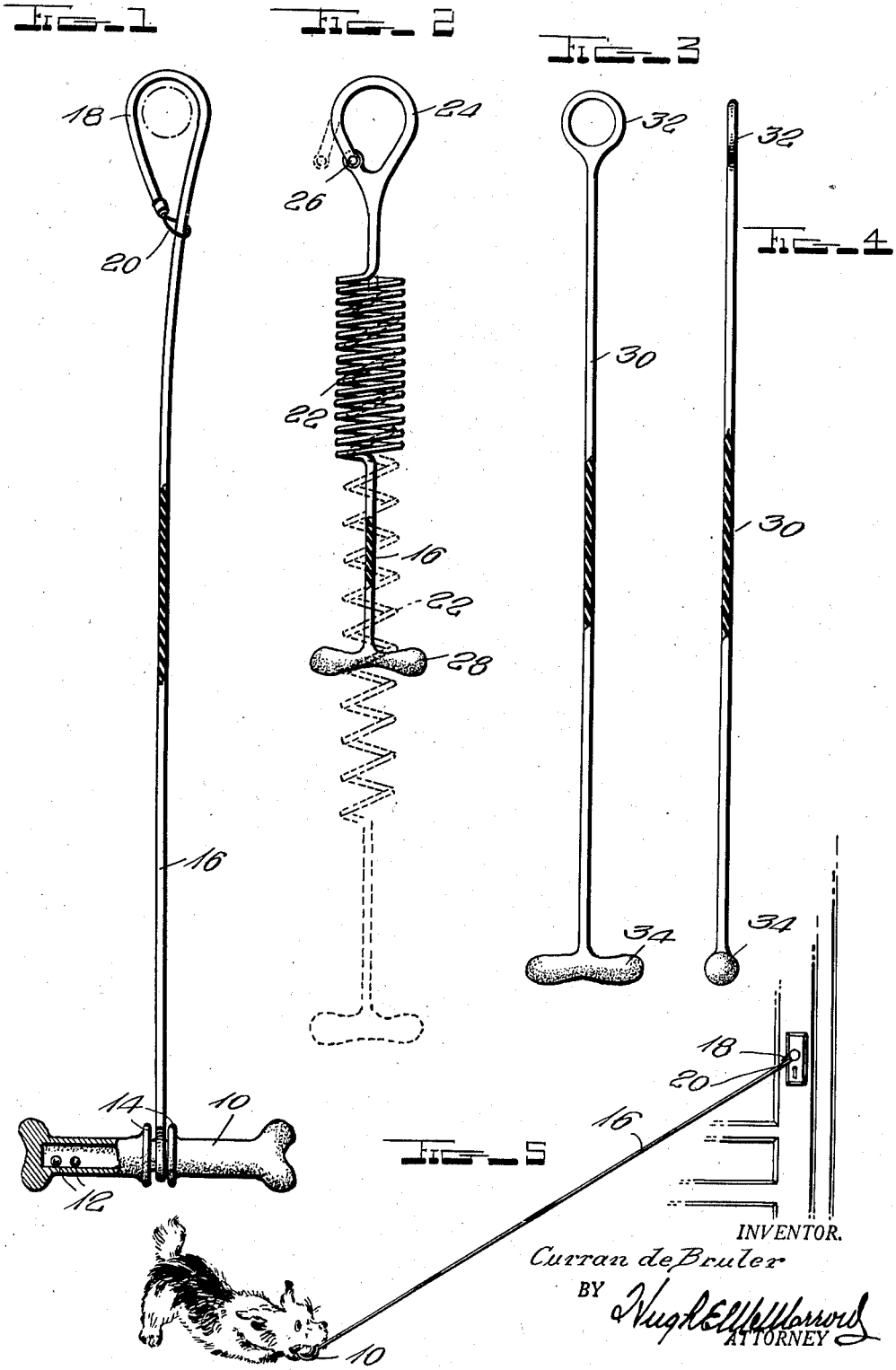

2,194,736

UNITED STATES PATENT OFFICE 2,194,736

ANIMAL EXERCISING AND AMUSEMENT DEVICE

Curran de Bruler, Washington, D. C.

Application November 3, 1938, Serial No. 238,655

3 Claims. (Cl. 272—86)

My invention relates to an animal exercising and amusement device, and its general object is to provide a device for canines, cats, and other pet animals to play with, which will amuse them, and at the same time give them all the exercise they desire, or require.

A further object of my invention is to provide a device of this character which may conveniently be used in the home and which is adapted to be supported by articles of furniture, door knobs, etc., and which requires no special support.

A still further object of my invention is to provide a device of this character which does not require the special attention of an operator after the device has been secured to a support.

A still further object of my invention is to provide a device of this character which is inexpensive, elastic, durable, and easy to manufacture, as it may, if desired, be moulded in a single unitary structure.

A still further object of my invention is to provide a device of this character adapted to be grasped by the mouth of an animal, which may be of any suitable elastic or compressible material or substance, whereby the animal may bite, chew, pull, tug or jerk on the device without injury to the mouth or teeth.

A still further object of my invention is to provide a device of this character containing a substance which gives off odors pleasing and attractive to animals.

With these and other objects in view, my invention comprises the various features hereinafter more fully described and more particularly defined in the claims.

Referring now to the drawing forming a part of this application:

Fig. 1 is a front elevation of the preferred form of my invention, partly in section;

Fig. 2 is a front elevation of a modification, the dotted lines representing the device when in extended position;

Fig. 3 is a front elevation of another modification;

Fig. 4 is a side elevation of the modification shown in Fig. 3; and

Fig. 5 is a perspective view.

The proclivity of all canines and more particularly that class of canines commonly referred to as "house dogs," that is to say dogs which are kept as pets, usually in the apartment or home of the owner, to chew on articles of wearing apparel, such as slippers, etc., which are left within their reach, is well known. It is also well known that all canines like to gnaw and pull at a bone. The same thing is true concerning cats and doubtless of other animals which are kept as house pets. I have found that by using my exercising and amusement device, much wear and tear on household articles, and wearing apparel, such as slippers, etc., is avoided, as the animal prefers the exercising and amusement device to such articles. Furthermore, the family newspaper, which such pets usually like to "wool" and tear, no longer seems to have the attraction that it once did, since my exercising and amusement device is available to play with, and, as a result, torn bits of paper, etc., are not found scattered about the house.

Moreover, with the use of my device, pet animals may get all the exercise they desire, or require, without the necessity of long walks by their owner or caretaker. All that is necessary is to fasten the device on some convenient article of furniture, such as the arm of a chair, etc., or the door knob, and the animal will amuse and exercise itself. Of course, if desired, the device may be held in the hand of the operator, instead of being fastened to a stationary support, and it may also be used to exercise two animals, one grasping it with its mouth on one end of the bone shaped member and another on the other end of same.

Referring now to the drawing illustrating the preferred embodiments of my invention, in which similar reference characters represent similar parts, in Fig. 1, the numeral 10 represents a hollow, bone shaped member, preferably of some durable, elastic material, such as rubber, in the hollow of which is placed a plurality of sound producing devices 12, which may consist of hollow metallic spheres, having metal objects (not shown) therein, to produce sound, of the conventional type, such as is common in "baby rattlers" for instance. The bone shaped member 10 is provided with two lips or flanges 14, spaced apart slightly so as to prevent the elastic member 16 from slipping off member 10 when pressure or pull is exerted. The member 16 may be constructed of any elastic material, in order that increasing resistance be met when the animal pulls or tugs on the device. The elastic member 16 is provided at its upper end with a looped portion 18, whereby the device may be fastened onto any convenient support, or held in the hand of the operator, if desired. The looped portion has a strap or band 20 extending around the elastic member 16 to secure the loop. The bone shaped member 10 is detachably secured to the elastic member 16, and may be of any desired shape or material. For example, it may be hollow and porous, the hollow space being adapted to receive a substance which gives off odors pleasing and attractive to animals, as is well known in the art, such for instance as catnip, which is quite attractive to cats. The member 10 may also be of other shapes and configurations, not shown, such as the form of a ring, ball, mouse, rat, etc., as is also well known in the art.

Referring now to the modification shown in Fig. 2, the device may be moulded in a single unitary structure, with an additional degree of elasticity provided by the spiral spring 22, the entire device, including the spiral spring, being made of some durable elastic material, such as rubber or the like. The loop portion 24 is provided with a conventional snap fastener, or other suitable conventional fastening device, for conveniently securing the device to a suitable support. In this modification the member 28 adapted to be grasped by the mouth of the animal, is preferably of some durable elastic material, such as rubber, for instance, which may be solid all the way through.

Referring now to the modifications shown in Figs. 3 and 4, the device may be moulded in a single unit from an elastic compound, such as rubber or the like. The member 34, adapted to be grasped by the mouth of the animal may be either solid or hollow. The looped portion 32 of the elastic member 30 is adapted to be fastened over a suitable support, or an additional loop may be formed by drawing a portion of the member 30 through the loop 32, thus forming the additional loop of any desired size.

Referring now to Fig. 5, this is merely a perspective view showing the device of Fig. 1 in use by a canine, in which the device is supported by a conventional door knob.

In use, the device may be held by the looped portion in the hand of the operator and the bone shaped member thrown about to attract the attention and interest of the animal, who will grasp the member in its mouth, as illustrated in Fig. 5. Due to the resiliency of the device, the harder the animal pulls, jerks or tugs, the more resistance is met, which serves to incite the animal to pull harder and it will play with the device for hours at a time, thus eliminating wear and tear on articles with which the animal usually resorts to play, such as stray stockings and slippers that may have been carelessly left exposed in the house. Then too, the sound producing bone illustrated in the preferred form of my invention seems to have an attraction to animals, canines and cats particularly, and arouses their interest. Once the animal has become accustomed to the device, it may be fastened to any suitable support and left dangling, so that the pet may play with it at will, and, as stated above, will sometimes play with it for hours on end, thus exercising every muscle of the body and being amused at the same time as well.

While the invention has been illustrated and described in some detail, it is to be understood that the invention is not to be limited to such details, but only by the spirit of the invention and the scope of the appended claims.

I claim:

1. An animal exercising and amusement device, comprising a member adapted to be grasped by the mouth of an animal, an expansible elastic member affixed to said member, and means for detachably securing said elastic member to a support.

2. An animal exercising and amusement device, comprising an expansible elastic member, means for detachably securing said elastic member to a support and a member adapted to be grasped by the mouth of an animal detachably affixed to said elastic member.

3. An animal exercising and amusement device, comprising a single piece of expansible elastic material, one end of which is shaped to simulate the appearance of a bone and adapted to be grasped by the mouth of an animal, the opposite end being adapted to be detachably secured to a support.

CURRAN DE BRULER.